Patented Apr. 18, 1939

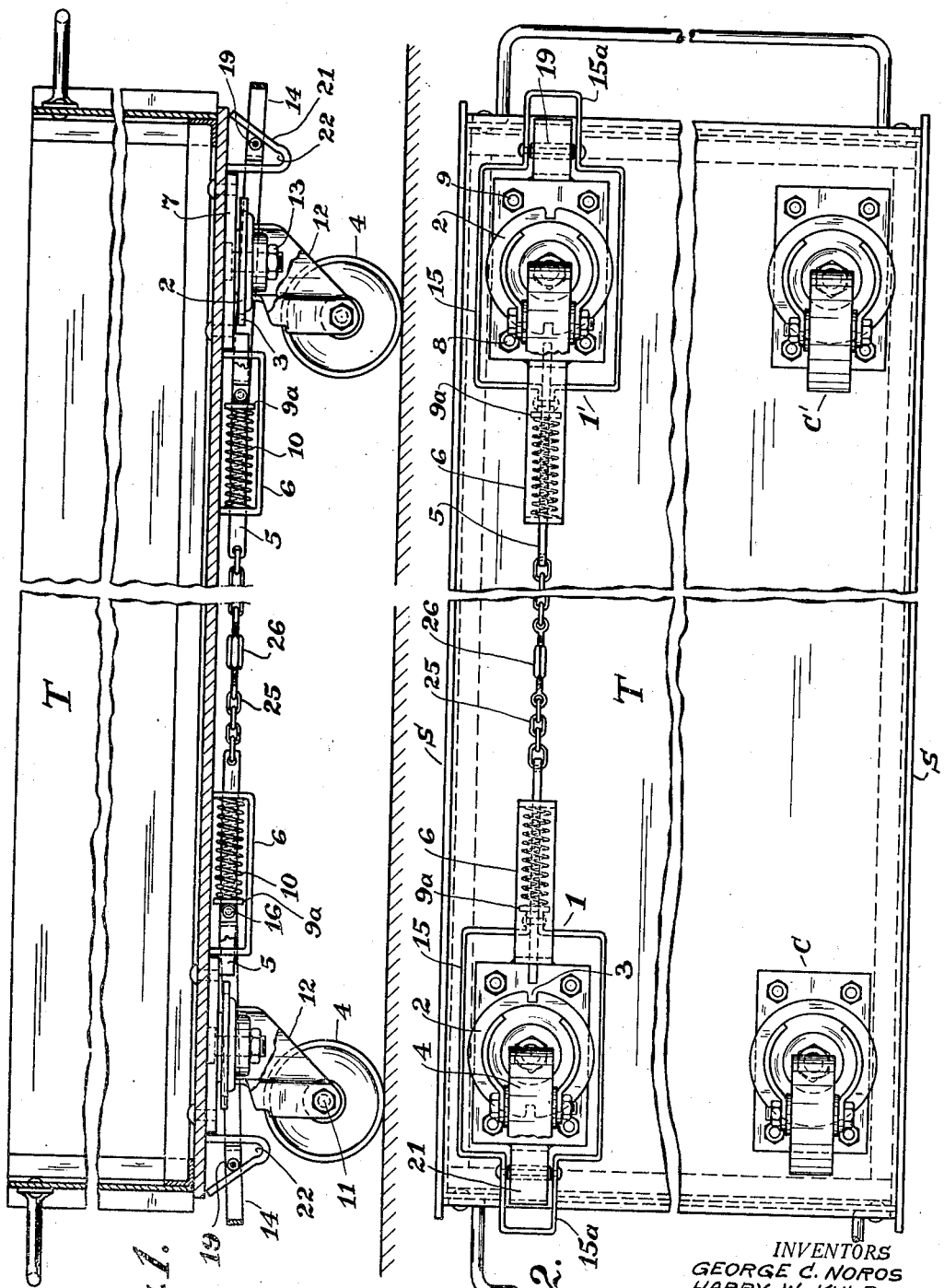

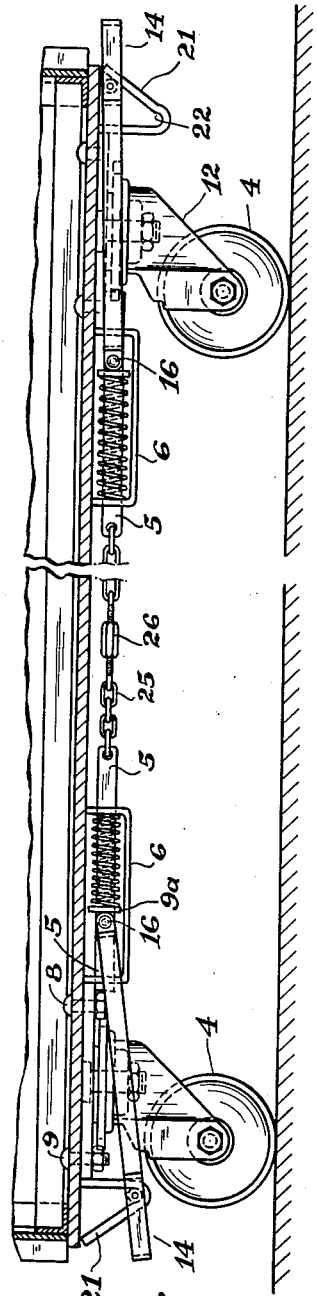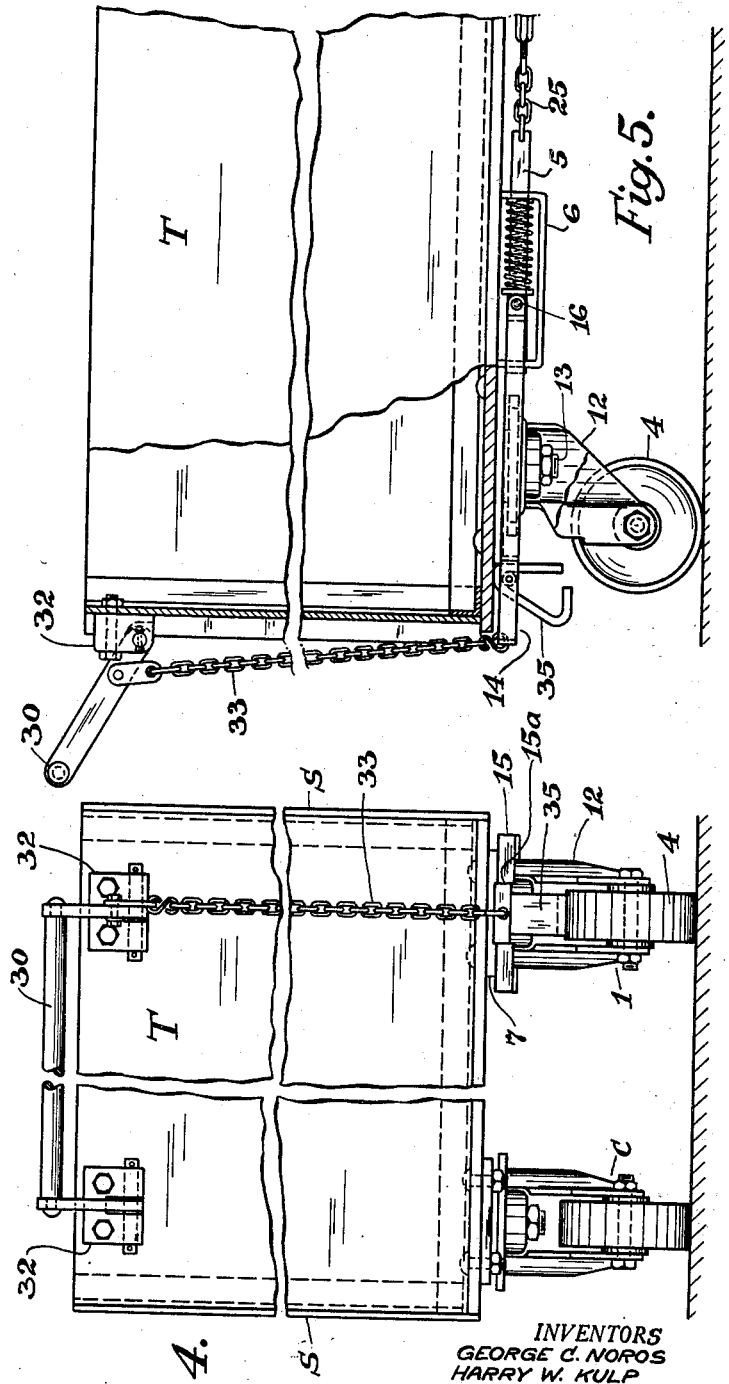

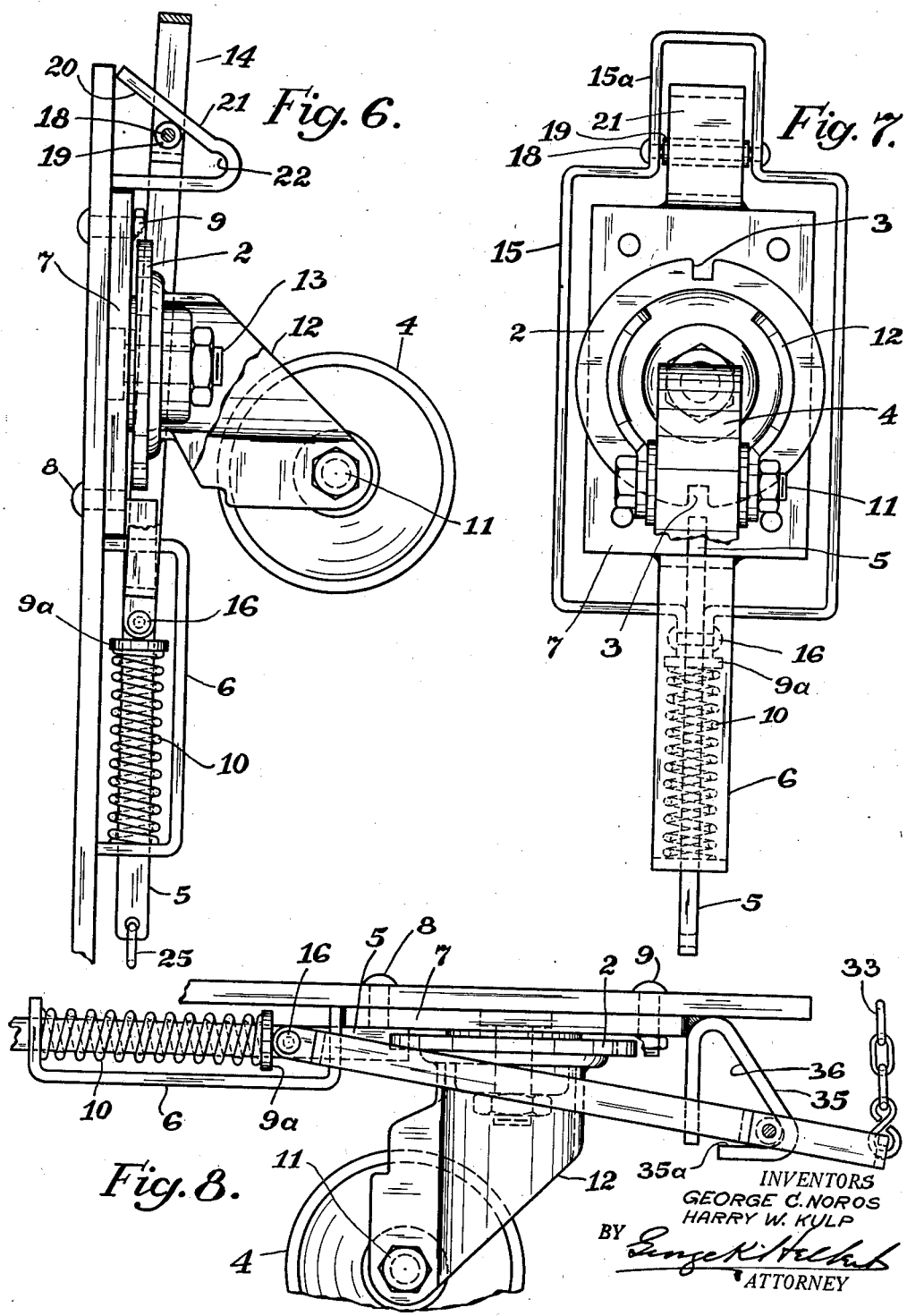

2,154,525

UNITED STATES PATENT OFFICE 2,154,525

CASTER CONTROL MEANS FOR MOVABLE TRUCKS AND THE LIKE

George C. Noros, Manheim, and Harry W. Kulp, Lancaster, Pa., assignors to Bond Foundry & Machine Company, Manheim, Pa., a corporation of Pennsylvania Application April 8, 1938, Serial No. 200,966

8 Claims. (Cl. 280—49)

Our invention relates to movable trucks, racks and similar vehicles for transporting articles over short distances, such as about a shop or mill, and is especially directed to the provision in a truck or the like having swivel casters of means associated with a longitudinally aligned pair of casters for selectively locking one of them in position to facilitate control of the direction of movement of the truck.

As is well known, when all the casters on a truck of this general character are free to swivel it is difficult to guide it, especially when it is being pushed from the rear, and our invention therefore contemplates the locking of a caster at the leading end of the truck so as to constrain the wheel of this caster to rotate only in a plane parallel to the sides of the truck and thereby facilitate the accurate control of its direction of travel when it is being manipulated from the opposite end. Our invention further contemplates the provision in one of its embodiments of a folding push bar at each end of the truck which when raised to operative position affords a convenient hand grip for the operator when moving and guiding the truck and which as it is brought to that position automatically brings about the locking of a caster at the opposite end.

The principal object of our invention therefore is to provide in a truck or similar vehicle having a pair of swivel casters improved control means associated therewith operable from either end of the truck to lock the caster at the opposite end in such manner as to constrain its wheel to rotate only in a plane parallel to the sides of the truck.

A further object is to provide mechanism which is effective when brought to predetermined position to actuate caster locking mechanism to automatically place one caster in locked or in potentially locked condition and when returned to its original position to automatically relieve such condition and thereby unlock the caster previously locked.

Another object of the invention is to provide in a movable truck a pair of swivel casters respectively disposed at its opposite ends and means for selectively locking either caster against swiveling yet so interconnected as to be normally in balanced relation with neither caster locked, in combination with novel mechanism operable to bring about the locking of the caster at the opposite end through upsetting this balanced relation.

Other objects, purposes and advantages of the invention will hereafter more fully appear or be understood from the following description of certain illustrative embodiments thereof as shown in the accompanying drawings.

In general, therefore, the purposes and objects of our invention are analogous to those of the caster control means for movable trucks and the like forming the subject of the pending application for United States patent of Irving P. Schreck and Chester S. Mann, Serial Number 150,514, filed June 26, 1937 and allowed March 22, 1938, our invention, however, constituting in certain respects an improvement thereon.

In the said drawings Fig. 1 is a fragmentary vertical longitudinal section of a truck equipped with our caster control mechanism, the parts being shown in normal position, that is, the position in which both the controlled casters are free to swivel;

Fig. 2 is a bottom plan view thereof;

Fig. 3 is a fragmentary view generally similar to Fig. 1 but showing the parts in the position assumed when the right hand caster is locked;

Fig. 4 is an end view of a truck generally similar to that shown in the preceding figures but equipped with a modified form of the invention in which the means for locking the casters include movable push bars at the ends of the truck.

Fig. 5 is a fragmentary vertical longitudinal section substantially on line 5—5 of Fig. 4.

Fig. 6 is an enlarged side elevation of one of the casters shown in Fig. 1;

Fig. 7 is a bottom view thereof with a portion of the caster wheel broken away for clearness of illustration; and Fig. 8 is a fragmentary side elevation, generally corresponding to Fig. 6, of one of the locking casters shown in Figs. 4 and 5.

In the several figures like symbols are used to designate the same parts.

Referring now more particularly to the drawings, the truck T, the detail construction of which is not material, represents any truck or other vehicle adapted for support from swivel casters and is provided with four such casters respectively located adjacent its several corners. Two of the casters C, C' may be of any desired character and require no specific description since they form no part of the invention, and as both of the other or locking casters 1, 1' and their associated mechanisms are alike, a description of one of them will suffice.

Thus, each locking caster comprises a swivel plate 2 having a pair of diametrically opposed, substantially rectangular notches 3 disposed in the plane of its caster wheel 4 selectively adapted for reception of one end of a locking plunger 5 which, when entered in either notch, prevents movement of the swivel plate about its axis and thus maintains the plane of rotation of the wheel parallel with the sides S of the truck. The plunger is supported for sliding movement relatively to the swivel plate in a bracket 6 projecting from the caster base plate 7 which seats against the bottom of the truck and is secured thereto by bolts 8 and nuts 9, the plate being suitably drilled for the passage of the bolts. Bracket 6 comprises a longitudinally extending portion and upturned ends one of which is welded to the base plate when the bracket is formed separately therefrom, and these ends are pierced for the passage of the plunger so it will form a good sliding fit therein and can thus move freely toward or away from the swivel plate in a direction generally radially thereof. Between the ends of the bracket the plunger carries a collar 9a and a coil spring 10 surrounds the plunger between the collar and the outer end of the bracket and constantly biases the plunger toward the plate.

Caster wheel 4 is mounted on an axle 11 supported in a yoke 12 depending below the swivel plate and rotatable with the latter about a king bolt 13 extending from base 7 whereby the wheel is free to turn about the axle and the wheel, yoke and plate to swivel about the king bolt in the usual way, the particular construction of these parts and arrangement of anti-friction bearings which are usually provided for facilitating the swiveling and reducing friction forming no part of the present invention.

Means comprising a trip lever pivoted to the plunger for vertical movement and a camming element cooperative therewith are provided for forcing the plunger away from the swivel plate against the bias of spring 10 and while the specific form and construction of these elements is capable of material variation, the lever herein shown and generally designated as 14 comprises a substantially rectangular frame 15 of sufficient size to surround and clear the base plate 7 and having a generally U-shaped loop 15a formed at one end. Desirably this frame is made from a single strip of metal suitably bent to the proper shape and having its free ends brought together on opposite sides of the plunger to which they are pivotally secured between the ends of bracket 6 by a pivot bolt 16. The frame is thus free to move vertically about the bolt and its ends form an abutment for the collar 9a.

Within the loop 15a of the frame is disposed a transversely extending shaft 18 preferably carrying a roller 19, and this roller, or the shaft if the roller is omitted, is cooperative with an inclined camming surface 20 on an elbow 21 extending beyond and depending below the opposite end of base 7 from that end thereof from which bracket 6 projects. The elbow, which is of less width than the U portion 15a so it will clear the sides of the latter, may be an integral extension of the base but is preferably made separately therefrom and welded thereto as shown, and at the lower end of its inclined surface 20, which desirably lies at an angle of about 40° to the axis of the king bolt, the elbow is formed to provide a dwell 22 for the reception of the roller so shaped that when the latter is engaged in the dwell the pressure of spring 10 acting through the plunger and pivot 16 constrains the roller to remain therein from which position, however, it can be readily disengaged by suitably directed pressure on the outer end of the loop 15a.

The casters 1, 1' are so positioned on the truck that their respective frame loops 15a project a little beyond the truck ends so they can be readily reached by the toe of the operator's foot and the adjacent ends of their inwardly oppositely directed plungers are interconnected by a chain 25 or similar non-stretchable but flexible connecting member, in which may be interposed a turn buckle 26 for adjusting its length, in such manner that the plungers and their respective springs are normally maintained in balanced relation free of engagement with their adjacent swivel plates but capable of movement in both directions relatively thereto to allow either plunger to engage its plate and enter either of notches 3 therein when aligned with it. Since flexible element 25 forms the sole connection between casters 1, 1' it is unnecessary that they be mounted on the truck in exact alignment with each other as they function substantially as well when slightly out of alignment as they do when perfectly aligned, while provision of the turn buckle 26 or other length regulating means facilitates exact adjustment of the length of the flexible element after the casters have been initially secured in place or at any other time.

When the truck is being moved about under ordinary conditions all the casters are left free to swivel and the parts associated with locking casters 1, 1' therefore occupy the positions shown in Figs. 1, 2, 6, and 7, the plungers being retracted from their adjacent swivel plates and levers 14 being supported in slightly oppositely downwardly inclined position from their respective pivots 16 by engagement of rollers 19 on the inclined surfaces 20 of elbows 21. Assuming the truck is being pushed to the right in Fig. 1 and that it is desired to lock the leading caster 1', the operator merely depresses lever 14 of caster 1 by stepping on loop 15a, thereby causing roller 19 to travel down the inclined surface of the adjacent elbow until it engages the dwell at the lower end thereof. During this movement the lever is pushed forwardly towards the opposite end of the truck through the camming action exerted on the roller by the inclined surface 20 and correspondingly moves plunger 5 in a like direction against the bias of spring 10, thus permitting the spring 10 of caster 1' to force its plunger toward its swivel plate and, if one of the notches 3 thereof happens to be in alignment with the plunger, the latter immediately enters the notch and locks the caster 1. On the other hand, if neither of notches 3 is aligned with the said plunger as it is urged forward by the spring, it is pressed into engagement with the periphery of the swivel plate and assumes a potentially locking position from which it can readily snap into either of the notches when subsequent swiveling of the caster brings one of them into registry with it so as to fully lock the caster against further swiveling.

Caster 1' then remains locked without further attention from the operator for as long as may be desired but may be readily released and returned to swiveling condition by merely disengaging roller 19 of caster 1 from dwell 22, conveniently by lifting lever 14 by insertion of the toe of the operator's foot beneath its outer end; immediately this disengagement is effected spring 10 of caster 1 functions to restore the normal balanced relation between the two plungers, thereby retracting the opposite plunger from locking engagement with the adjacent swivel plate and returning the parts to the position shown in Fig. 1. It will of course be appreciated that caster 1 may be as readily locked and then unlocked by corresponding manipulation of lever 14 of caster 1'.

In the form of the invention shown in Figs. 4, 5, and 8 the actuation of the levers to lock the casters is effected through the medium of vertically movable push bars 30 respectively attached to the ends of the truck by brackets 32 in such manner that when not in use the bars hang in a more or less vertical position from which either can be raised as shown in Figs. 4 and 5 when the truck is to be moved about, the brackets being preferably so constructed as to limit the possible upward movement of the bars. Each of these bars is connected by a chain or other flexible non-stretchable member 33 with the subjacent lever 14 of the adjacent locking caster so that when the bar is raised preparatory to moving the truck the lever is lifted. The elbow 35 associated with each caster, and generally corresponding in function to elbow 21 in the form of the invention previously described, is so arranged that its camming surface 36 is inclined inwardly instead of outwardly while no dwell is provided to receive roller 19 carried by the lever so that the mere lowering of the push bar will release the lever to restore the casters to normal balanced relation. The elbow is preferably made from a strip of flat metal and its ends bent so as to approach each other substantially along the legs of a right triangle the hypotenuse of which corresponds to the inclined camming surface of the elbow; the lower leg 35a then forms a stop to limit the downward movement of roller 19 and thus prevent the lever 14 from dropping too far when the push bar is lowered; otherwise the construction of the parts associated with the casters is similar to those of the corresponding ones in the form of the invention previously described.

As in that form of the invention, under normal conditions the balanced relation between the plungers 5, 5 is maintained when the push bars are lowered so that the plungers are out of engagement with their adjacent swivel plates and rollers 19, resting on stops 35a, are adjacent the lower ends of the camming surfaces. However, when the push bar at one end of the truck is raised, adjacent lever 14 is correspondingly lifted thus pushing the plunger associated therewith away from its swivel plate and allowing the opposite plunger to move toward its plate until roller 19 of that lever which is moving upwardly substantially attains the upper end of the camming surface 36. The plunger at the opposite end of the truck has now either locked the caster at that end or is in engagement with its swivel plate and thus in condition to lock it the moment one of the plate notches comes into registry with it, and the caster then remains locked so long as the bar is held up as when the truck is being pushed about. Immediately the bar is lowered, however, the adjacent spring 10 pushes the roller downwardly along the camming surface of the elbow and so assists the gravity return of the lever to normal or lowered position with consequent resumption of the normal balanced relation between the plungers.

It will now be apparent that our invention in either of the embodiments to which we have referred provides an extremely simple and efficient means for locking or unlocking a caster at one end of a truck or the like by manipulation of mechanism at the opposite end and that as similar locking casters are used at each end of the truck the necessity of making them in rights and lefts or with oppositely disposed parts in accordance with the positions they are designed to occupy thereon is obviated. This is a great advantage from a production standpoint as but a single set of dies and other tools is required to produce the casters in a given size, while the dealer can take care of substantially the same amount of business with one-half the amount of stock on his shelves. Moreover, all of the principal parts are of a type which may be readily fabricated from steel plates and bars of readily obtainable sizes and thus no castings or drop forgings are required.

While we have herein specifically shown and described certain embodiments of our invention, it will be understood that changes and modifications in the form, structure, arrangement and method of assembly of the instrumentalities employed will readily occur to those skilled in the art and may be made if desired without departing from the spirit and scope of the invention as defined in the appended claims.

Having thus described our invention we claim and desire to protect by Letters Patent of the United States:

1. In combination with a truck or the like, a pair of swivel casters having notched swivel plates, locking plungers respectively adapted to enter the notches in the plates to lock the casters against swiveling, yielding means urging the plungers toward the plates, flexible means of predetermined length interconnecting the plungers, a vertically movable lever pivoted to each plunger, and camming means adapted to urge the lever in a direction to move the plunger away from the plate as the lever is moved in one direction about its pivot.

2. In combination with a truck or the like, a pair of swivel casters having notched swivel plates, locking plungers respectively adapted to enter the notches in the plates to lock the casters against swiveling, a spring biasing each plunger toward the adjacent plate, flexible means of predetermined length interconnecting the plungers, a vertically movable lever pivoted to each plunger, and camming means remote from the point of pivotal connection of the lever and plunger adapted as the lever is moved vertically in a predetermined direction to urge it in a generally longitudinal direction to move the plunger against the bias of the spring.

3. In combination with a truck or the like, a pair of swivel casters having notched swivel plates, locking plungers respectively adapted to enter the notches in the plates to lock the casters against swiveling, a spring biasing each plunger toward the adjacent plate, flexible means of predetermined length interconnecting the plungers, a vertically movable lever pivoted to each plunger and means providing an inclined surface cooperative with the lever to urge the latter in a generally longitudinal direction as it is moved about its pivot in another direction and thereby move the plunger against the bias of the spring.

4. In combination with a truck or the like, a pair of swivel casters having notched swivel plates, locking plungers respectively adapted to enter the notches in the plates to lock the casters against swiveling, a spring biasing each plunger toward the adjacent plate, flexible means of predetermined length interconnecting the plungers, a vertically movable lever pivoted to each plunger, a roller carried thereby remote from the pivot, means providing an inclined surface and a dwell at one end thereof cooperative with the roller to move the lever longitudinally when it is moved vertically in one direction about its pivot to thereby move the plunger against the bias of the spring, the dwell being effective to receive and releasably retain the roller at the conclusion of said longitudinal movement.

5. In combination with a truck or the like, a pair of swivel casters having notched swivel plates, locking plungers respectively adapted to enter the notches in the plates, flexible means of fixed maximum length interconnecting the plungers, a push bar disposed adjacent each end of the truck and vertically movable between operative and inoperative positions, yielding means urging each plunger toward its adjacent swivel plate, a lever pivoted to each plunger for vertical movement, camming means cooperative with each lever to urge it longitudinally to thereby move the plunger away from the plate against the bias of said yielding means when the lever is moved about its pivot in one direction, and a connection between each push bar and the subjacent lever operative to move the lever in said direction as the push bar is raised to operative position.

6. In combination with a truck or the like, a pair of swivel casters having notched swivel plates, locking plungers respectively adapted to enter the notches in the plates, flexible means of fixed maximum length interconnecting the plungers, a push bar disposed adjacent each end of the truck and vertically movable between operative and inoperative positions, a spring urging each plunger toward its adjacent swivel plate, a lever pivoted to each plunger for vertical movement, fixed camming means cooperative with the lever to urge the latter in a direction to move the plunger against the bias of the spring when the lever is lifted, and a connection between each push bar and the subjacent lever adapted to lift the latter as the push bar is raised to operative position.

7. In combination with a truck or the like, a pair of swivel casters, means respectively adapted to lock the casters against swiveling, yielding means urging the locking means toward locking position, flexible means of predetermined length interconnecting the locking means, a lever pivoted to each locking means, and camming means adapted when the lever is moved in one direction about its pivot to move the adjacent locking means out of locking position in opposition to said yielding means.

8. In combination with a truck or the like a pair of swivel casters, each caster comprising a swivel plate, means adapted to engage the plate to lock it against swiveling and yielding means urging said locking means toward locking position, flexible means of predetermined length interconnecting the locking means, actuating means movably connected to each locking means and camming means respectively cooperative with the actuating means to move such locking means away from locking position as the actuating means is moved in one direction.

GEORGE C. NOROS.
HARRY W. KULP.